United States Patent
Ashjaee

(10) Patent No.: US 11,782,165 B2
(45) Date of Patent: Oct. 10, 2023

(54) ENHANCED REAL-TIME KINEMATIC (RTK)

(71) Applicants: Javad GNSS, Inc., San Jose, CA (US);
Mitra Ashjay, Saratoga, CA (US)

(72) Inventor: Javad Ashjaee, Saratoga, CA (US)

(73) Assignee: Javad GNSS, Inc., San Jose, CA (US)

( * ) Notice: Subject to any disclaimer, the term of this patent is extended or adjusted under 35 U.S.C. 154(b) by 116 days.

(21) Appl. No.: 17/235,656

(22) Filed: Apr. 20, 2021

(65) Prior Publication Data

US 2021/0325542 A1     Oct. 21, 2021

Related U.S. Application Data

(60) Provisional application No. 63/013,398, filed on Apr. 21, 2020.

(51) Int. Cl.
*G01S 19/04* (2010.01)
*G01S 19/42* (2010.01)
*G01S 19/13* (2010.01)
*G01S 19/43* (2010.01)

(52) U.S. Cl.
CPC .............. *G01S 19/04* (2013.01); *G01S 19/42* (2013.01); *G01S 19/13* (2013.01); *G01S 19/43* (2013.01)

(58) Field of Classification Search
CPC .......... G01S 19/04; G01S 19/13; G01S 19/42; G01S 19/43
USPC ............. 342/357.41, 357.26, 357.25, 357.51
See application file for complete search history.

(56) References Cited

U.S. PATENT DOCUMENTS

| | | | |
|---|---|---|---|
| 5,914,685 A | 6/1999 | Kozlov et al. | |
| 6,127,968 A | 10/2000 | Lu | |
| 6,437,734 B1* | 8/2002 | McBurney | G01S 19/071 342/357.62 |
| 7,679,555 B2* | 3/2010 | Dai | G01S 19/41 342/357.31 |
| 8,587,475 B2* | 11/2013 | Leandro | G01S 19/40 342/357.27 |
| 8,760,343 B2* | 6/2014 | Milyutin | G01S 19/43 342/357.59 |
| 9,535,161 B2* | 1/2017 | Veitsel | G01S 19/13 |
| 9,891,325 B2* | 2/2018 | Milyutin | G01S 19/43 |

(Continued)

FOREIGN PATENT DOCUMENTS

RU     2696856 C1     8/2019

OTHER PUBLICATIONS

Application No. PCT/US2021/028229, International Search Report and Written Opinion, dated Aug. 18, 2021, 12 pages.

(Continued)

*Primary Examiner* — Chuong P Nguyen
(74) *Attorney, Agent, or Firm* — Kilpatrick Townsend & Stockton LLP

(57) ABSTRACT

An exemplary method of calculating a position of a GNSS device (e.g., a GNSS rover device) comprises: at the GNSS device in an enhanced real-time kinematic (RTK) mode: receiving a first set of GNSS data corresponding to a first epoch; storing the first set of GNSS data in a buffer; receiving a second set of GNSS data corresponding to a second epoch that is after the first epoch; after receiving the second set of GNSS data, retrieving the first set of GNSS data from the buffer; and calculating the position of the GNSS device based on the retrieved first set of GNSS data and the second set of GNSS data.

20 Claims, 4 Drawing Sheets

(56) References Cited

U.S. PATENT DOCUMENTS

| | | | |
|---|---|---|---|
| 10,422,885 B2* | 9/2019 | Dai | G01S 19/44 |
| 11,415,705 B2* | 8/2022 | Chen | G01S 19/43 |
| 2014/0240172 A1* | 8/2014 | Milyutin | G01S 19/43 |
| | | | 342/357.51 |
| 2017/0219715 A1 | 8/2017 | Ashjaee | |
| 2019/0391274 A1* | 12/2019 | Chen | G01S 19/44 |
| 2020/0132860 A1 | 4/2020 | Dmitrievich et al. | |

OTHER PUBLICATIONS

PCT/US2021/028229, "International Preliminary Report on Patentability", dated Nov. 3, 2022, 8 pages.

* cited by examiner

ENHANCED REAL-TIME KINEMATIC (RTK)

CROSS-REFERENCE TO RELATED APPLICATIONS

This application claims priority to U.S. Provisional Patent Application No. 63/013,398, filed on Apr. 21, 2020 and entitled "ENHANCED RTK," which is hereby incorporated by reference in its entirety.

FIELD

The present disclosure relates to Global Navigation Satellite Systems (GNSS), such as Global Positioning System (GPS), GLONASS, Galileo, BeiDou, and other satellite navigation and positioning systems.

BACKGROUND

Navigation receivers that use global navigation satellite systems, such as GPS or GLONASS (hereinafter collectively referred to as "GNSS"), enable a highly accurate determination of the position of the receiver. The satellite signals may include carrier harmonic signals that are modulated by pseudo-random binary codes and that, on the receiver side, may be used to measure the delay relative to a local reference clock. These delay measurements may be used to determine the pseudo-ranges between the receiver and the satellites. The pseudo-ranges are not true geometric ranges because the receiver's local clock may be different from the satellite onboard clocks. If the number of satellites in sight is greater than or equal to four, then the measured pseudo-ranges can be processed to determine the user's single point location as represented by a vector $X=(x, y, z)^T$, as well as to compensate for the receiver clock offset.

GNSS finds particular application in the field of surveying, which requires highly accurate measurements. The need to improve positioning accuracies has eventually led to the development of differential navigation/positioning. In this mode, the user position is determined relative to an antenna connected to a reference receiver or a network of reference receivers with the assumption that the positional coordinates of the reference receiver(s) are known with high accuracy. The reference receiver (also called a base receiver or base station) or receiver network transmits its measurements (or corrections to the full measurements) to a mobile navigation receiver (also called a rover station or rover). The rover uses this data to refine its measurements in the course of data processing. The rationale for this approach is that since the pseudo-range measurement errors on the base and rover sides are strongly correlated, using differential measurements will substantially improve positioning accuracy.

Typically, the base station is static and located at a known position. However, in relative navigation mode, both the base station and rover are moving. In this mode, the user is interested in determining the vector between the base station and the rover. In other words, the user is interested in determining the continuously changing rover position relative to the continuously changing position of the base station. For example, when one aircraft or space vehicle is approaching another for in-flight refueling or docking, a highly accurate determination of relative position is important, while the absolute position of each vehicle is generally not critical.

The position of the rover changes continuously in time, and thus should be referenced to a time scale. The determination of the position of a mobile rover with respect to a base receiver in real-time may be performed using a real-time kinematic (RTK) algorithm, which may be stored in memory on the rover. As the name "real-time kinematic" implies, the rover receiver is capable of calculating/outputting its precise position as the raw data measurements and differential corrections become available at the rover. When implementing an RTK algorithm, a data communication link (e.g., a radio communication link, a GSM binary data communication link, etc.) may be used to transmit the necessary information from the base station to the rover.

Further improvement of the accuracy in differential navigation/positioning applications can be achieved by using both the carrier phase and pseudo-range measurements from the satellites to which the receivers are locked. For example, by measuring the carrier phase of the signal received from a satellite in the base receiver and comparing it with the carrier phase of the same satellite measured in the rover receiver, one can obtain measurement accuracy to within a small fraction of the carrier's wavelength.

One well-known type of measurement error that can reduce the accuracy of differential navigation/positioning is multipath error. Multipath errors are caused by the reflection of the GNSS satellite signals by surfaces located near the receiving antenna. As a result of these reflections, the antenna receives both the direct signal traveling the shortest path from the satellite to the receiver as well as the reflected signals following indirect paths. The combination of two (or more) signals at the antenna leads to the distortion of raw measurements. Multipath errors may affect both pseudo-range and carrier phase measurements.

BRIEF SUMMARY OF THE DISCLOSURE

An exemplary method of calculating a location of a GNSS rover device comprises, at the GNSS rover device in an enhanced RTK mode: receiving a first set of GNSS data corresponding to a first epoch; storing the first set of GNSS data in a buffer; receiving a second set of GNSS data corresponding to a second epoch after the first epoch; after receiving the second set of GNSS data, retrieving the first set of GNSS data from the buffer; calculating the location of GNSS rover device based on the retrieved first set of GNSS data and the second set of GNSS data.

In some embodiments, the method further comprises: at the GNSS rover device in a standard RTK mode: receiving a set of GNSS data corresponding to a most recent epoch; calculating the location of GNSS rover device based on the set of GNSS data; and foregoing storing the set of GNSS data in the buffer.

In some embodiments, the first set of GNSS data is retrieved in response to a user input.

In some embodiments, the first set of GNSS data is retrieved in response to a determination that the location of the GNSS rover device has not been successfully calculated for a predetermined amount of time.

An exemplary method of calculating a location of a GNSS rover device comprises: at the GNSS rover device in an enhanced RTK mode: receiving a first set of GNSS data corresponding to a first epoch; storing the first set of GNSS data in a buffer; receiving a second set of GNSS data corresponding to a second epoch different from the first epoch; if an enhanced RTK operation is not triggered: calculating the location of the GNSS rover device based on the second set of data without retrieving data from the buffer; if an enhanced RTK operation is triggered: calculating the location of GNSS rover device based on data retrieved from the buffer.

In some embodiments, the method further comprises at the GNSS rover device in a standard RTK mode: receiving a set of GNSS data corresponding to a most recent epoch; calculating the location of GNSS rover device based on the set of GNSS data; and foregoing storing the set of GNSS data in the buffer.

In some embodiments, the enhanced RTK operation is triggered by an input by a user.

In some embodiments, the enhanced RTK operation is triggered by a determination that the location of the GNSS rover device has not been successfully calculated for a predetermined amount of time.

In some embodiments, the predetermined amount of time is user-selectable.

In some embodiments, the method further comprises clearing the buffer based on a user input.

In the following description, reference is made to the accompanying drawings which form a part thereof, and which illustrate several embodiments of the principles disclosed herein. It is understood that other embodiments may be utilized and structural and operational changes may be made without departing from the scope of the present disclosure. The use of the same reference symbols in different drawings indicates similar or identical items.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention as claimed. Thus, the various embodiments are not intended to be limited to the examples described herein and shown, but are to be accorded the scope consistent with the claims.

Today, the number of applications utilizing GNSS information is rapidly increasing. For example, GNSS information is a valuable tool for geodesists. Geodesists commonly use GNSS devices to determine the location of a point of interest anywhere on, or in the vicinity of, the Earth. Often, these points of interest are located at remote destinations that are difficult to access. Thus, compact, easy-to-carry positioning devices are desired.

GNSS receivers work by receiving data from GNSS satellites. To achieve millimeter and centimeter level accuracy, at least two GNSS receivers are needed. One receiver (e.g., a base station) is positioned at a site where the position is known. A second receiver (e.g., a rover) is positioned at a site whose position needs to be determined. The measurement from the first receiver is used to correct GNSS system errors at the second receiver. In post-processed mode, the data from both receivers can be stored and then transferred to a computer for processing. Alternatively, the corrections from the first receiver, the known receiver, may be transmitted in real time (via radio modems, Global System for Mobile Communications (GSM), cellular telephony, etc.) to the unknown receiver, and the accurate position of the unknown receiver determined in real time.

Various embodiments are described below relating to a portable (e.g., handheld) GNSS device. The GNSS device may include various sensors, such as one or more cameras, distance sensors, and/or horizon sensors. A display element may also be included for assisting a user to position the device without the aid of external positioning equipment (e.g., a tripod or pole).

Figure 1:
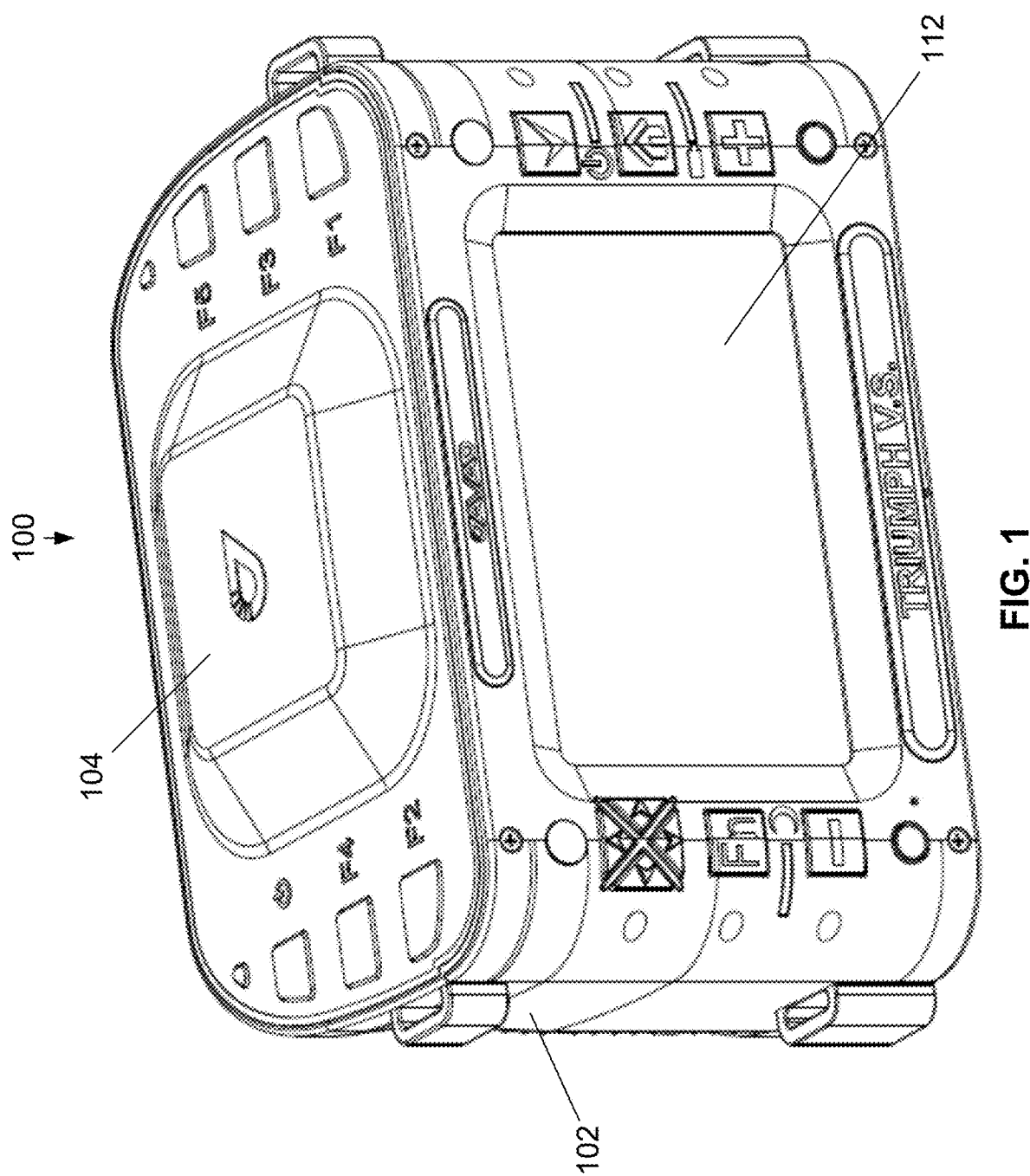
FIG. 1 illustrates a perspective view of a GNSS device according to embodiments as disclosed herein.

FIG. 1 illustrates an exemplary GNSS device 100. GNSS device 100 may utilize a single housing 102. Several GNSS elements may be integral to the housing 102 in that they are within the housing or securely mounted thereto. A securely mounted element may be removable. Housing 102 may be configured to allow the user to hold the GNSS device 100 similarly to the way one would hold a typical camera. In one example, the housing 102 may include GNSS antenna cover 104 to cover a GNSS antenna which may receive signals transmitted by a plurality of GNSS satellites and used by GNSS device 100 to determine position. The GNSS antenna may be integral with the housing 102 in that it resides in the housing 102 under the GNSS antenna cover 104.

In one example, the GNSS antenna may receive signals transmitted by at least four GNSS satellites. In the example shown by FIG. 1, GNSS antenna cover 104 is located on the top side of GNSS device 100. GNSS device 100 further includes covers for communication antennas integral with the housing 102. In embodiments as disclosed herein there may be three such communication antennas, including GSM, UHF, and WiFi/Bluetooth antennas enclosed beneath covers for the communication antennas.

GNSS device 100 may further include display 112 for displaying information to assist the user in positioning the device. Display 112 may be any electronic display such as a liquid crystal (LCD) display, light emitting diode (LED) display, and the like. Such display devices are well-known by those of ordinary skill in the art and any such device may be used. In the example shown by FIG. 1, display 112 is integral with the back side of the housing 102 of GNSS device 100. Additional details about GNSS device 100 can be found in U.S. Pat. Pub. No. 2019/0353798 ("Total Station with GNSS Device"), the content of which is hereby incorporated by reference in its entirety.

Figure 2:
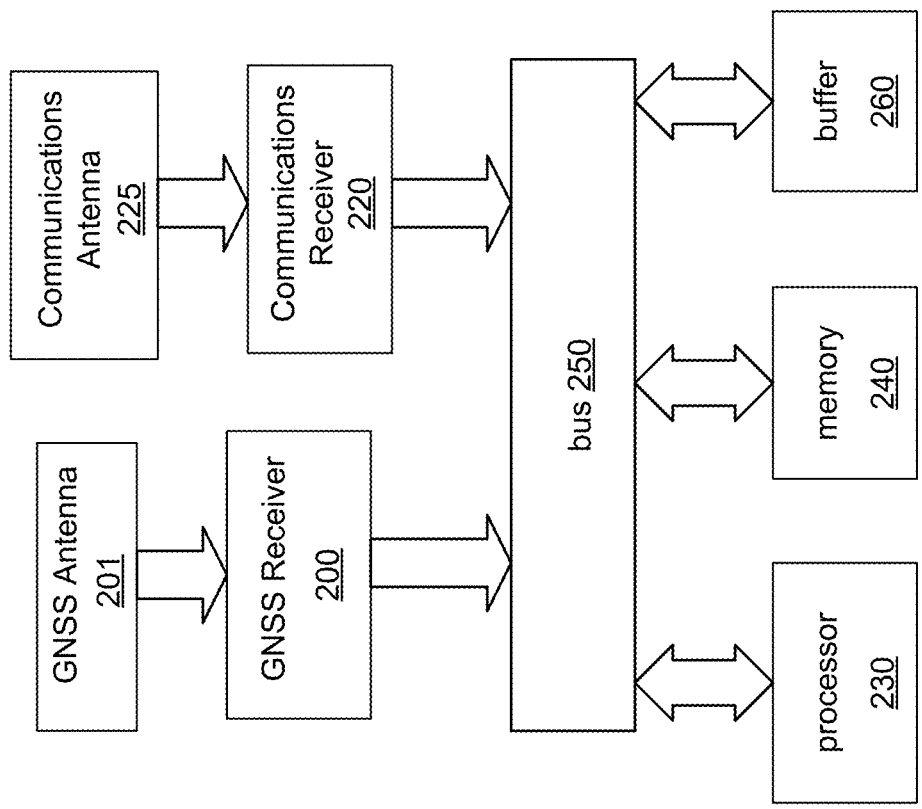
FIG. 2 illustrates an exemplary logic diagram showing relationships between various components of a portable GNSS device according to embodiments as disclosed herein.

FIG. 2 illustrates an exemplary logic diagram showing relationships between various components of an implementation of portable GNSS device 100. In one example, GNSS receiver 200 receives GNSS satellite signals from GNSS satellites (e.g., GPS, GLONASS, Galileo, and/or BeiDou satellites) via GNSS antenna 201. Each GNSS satellite signal may contain two pseudo-noise ("PN") code components, a coarse code, and a precision code residing on orthogonal carrier components, which may be used by GNSS receiver 200 to determine the position of the GNSS receiver. For example, a typical GNSS satellite signal may include a carrier signal modulated by two PN code components. The frequency of the carrier signal may be satellite-specific. Thus, each GNSS satellite may transmit a GNSS satellite signal at a different frequency. GNSS antenna 201 may be provided as part of GNSS device 100 (e.g., may be within housing 102) or may be an external antenna connected to GNSS device 100 (e.g., via an SMA connector). GNSS receiver 200 may produce measurements of the GPS satellite signals (e.g., code phase measurements, carrier phase measurements, Doppler measurements, and/or signal strength measurements) to be used by processor 230 for position calculation and/or to be stored in a buffer 260.

GNSS device 100 may include processor-executable instructions for performing position calculation (e.g., for performing process 300 or 400, described in greater detail below with respect to FIGS. 3 and 4) stored in a memory 240. The instructions may be executable by one or more processors, such as processor 230. However, those skilled in the relevant art will also recognize how to implement the current technology using other computer systems or architectures. Processor 230 may be implemented using a general or special purpose processing engine such as, for example, a microprocessor, microcontroller or other control logic. As discussed below, processor 230 may be implemented using a reduced-instruction-set computer (RISC) architecture. In the example of FIG. 2, a bus 250 carries data and instructions between processor 230, memory 240, and a buffer 260 (which may be in, for example, nonvolatile (e.g., flash) RAM, disk storage, a USB drive, etc.).

Memory 240 may include read only memory ("ROM") or other static storage device coupled to bus 250 for storing static information and instructions for processor 230. Memory 240 may also include random access memory (RAM) or other dynamic memory, for storing information and instructions to be executed by processor 230. Memory 240 may also be used for storing temporary variables or other intermediate information during execution of instructions to be executed by processor 230.

GNSS device 100 may further include a communications receiver 220 that receives GNSS data from one or more other GNSS devices (e.g., from a base station) via a communications antenna 225. The received GNSS data may include measurements of the GPS satellite signals (e.g., code phase measurements, carrier phase measurements, Doppler measurements, and/or signal strength measurements) as received by the other GNSS device(s), which may be used by processor 230 for position calculation and/or stored in buffer 260. Communications receiver 220 may receive the GNSS data over a communications channel such as, for example, a cellular phone link, an RF (e.g., UHF) link, or a Wi-Fi or other wireless network link. In one example, communications receiver 220 receives the GNSS data in the form of RTCM messages. Communications receiver 220 may also receive additional information for position calculation, such as a position (e.g. in the form of coordinates) of the base station (or of each of the other GNSS devices providing GNSS data).

In some examples, at least GNSS receiver 200, processor 230, memory 240, and bus 250 may be included within a handheld GNSS device similar or identical to that described in U.S. patent application Ser. No. 12/871,705, filed Aug. 30, 2010, issued as U.S. Pat. No. 8,125,376, and assigned to the assignee of the present application, which is incorporated herein by reference in its entirety. For example, the handheld GNSS device may include a display, orientation sensors, distance sensors, a camera, a compass, and the like, coupled to GNSS receiver 200 and/or processor 230.

GNSS device 100 may be configured to receive GNSS signals from one or more satellite GNSS signal sources. A GNSS signal received from a satellite can include a predetermined code sequence that repeats. Using timers on both GNSS device 100 and a satellite GNSS signal source, a distance between GNSS device 100 and a satellite GNSS signal source can be calculated. For example, a GNSS signal may comprise a predetermined sequence known to both GNSS device 100 and a satellite GNSS signal source. Based on when the sequence was transmitted by the satellite GNSS signal source, when the same sequence was received by GNSS device 100, and a time of flight (which can be based on the speed of light), a distance between GNSS device 100 and a satellite GNSS signal source can be calculated.

The carrier phase of a received GNSS satellite signal can include very short repetitions and may provide a high phase difference and/or distance precision, but it may not include sufficient information to determine how many complete cycles separate the GNSS device 100 and the satellite GNSS signal source. The code phase of a received GNSS satellite signal may not have sufficient granularity to estimate a distance with sufficient precision without knowledge of the signal's carrier phase. For example, the carrier phase may allow for a horizontal granularity of one millimeter, but the code phase may only allow for a horizontal granularity of one meter.

The carrier phase of a received GNSS satellite signal can be used to quickly estimate a phase differential (which may therefore indicate a component of the distance from the satellite signal source), but the number of cycles of the carrier signal between the GNSS device 100 and the satellite GNSS signal source may not be known (e.g., an unknown integer, also called "carrier-phase integer ambiguity"). In some embodiments, once the code phase of a GNSS satellite signal has been acquired/interpreted, a GNSS device may be considered "locked" to the originating satellite GNSS signal source. Determining an RTK solution can include the process of acquiring/interpreting carrier phase and code phase of GNSS satellite signals to determine distances from the satellite GNSS signal sources. In some embodiments, determining an RTK solution can include identifying a point in three-dimensional space based on estimated distances from satellite GNSS signal sources (which may have known locations and/or trajectories). In some embodiments, an RTK solution can be reached more quickly and/or can be more accurate as the number of detectable satellite GNSS signal sources increases.

GNSS device 100 may receive one or more correction signals from a base station (e.g., via communications receiver 220 as described above) as part of calculating an RTK solution. A base station can be placed at a known and/or fixed location and may be configured to receive GNSS signals from one or more satellite GNSS signal sources. Because a base station may be placed at a known and/or fixed location, one or more corrections (e.g., positional corrections) may be determined based on a position calculated from GNSS signals and a known and/or fixed position. Corrections may be used to offset inaccuracies in clock measurements (e.g., between a GNSS device and a satellite), atmospheric interference of GNSS signals, or other error sources. RTK solutions may be used to estimate a position of GNSS device 100 using GNSS signals received by GNSS device 100 and/or correction data received a from base station. Additional information on RTK solutions can be found in U.S. Pat. No. 8,120,527 ("Satellite Differential Positioning Receiver Using Multiple Base-Rover Antennas"), U.S. Pat. No. 8,872,700 ("GNSS Surveying Receiver with Multiple RTK Engines"), U.S. Pat. No. 10,281,588 ("GNSS Surveying Using RTK Engine Verification"), U.S. Pat. No. 10,408,944 ("Hybrid RTK"), the contents of which are hereby incorporated by reference in their entirety for the purpose of disclosing additional information on RTK solutions.

In some embodiments, a GNSS rover device (e.g., GNSS device 100) can support a post-processing mode, a RTK mode, an enhanced RTK mode, or any combination thereof. In the enhanced RTK mode, the GNSS device may continue to make RTK calculations, but an RTPK (Real Time Post-processed Kinematic) operation may also be triggered manually or automatically. The RTPK techniques provide benefits of both the post-processing mode and the RTK mode by bringing the post-processing techniques online in the rover data combined with the RTK.

Using the post-processing mode, the three-dimensional position of a GNSS rover device can be determined in an accurate manner at a computer separate from the base station or the rover device. In the post-processing mode, GNSS data, which includes data from the base station (e.g., correction data) and data from the rover station (e.g., GNSS signals received at the rover), are recorded. Both data are transferred to a computer (e.g., a remote computer or server) and processed to calculate the position of the rover via batch processing. The data being batch processed is not limited to one epoch, but rather can span across multiple epochs. For example, the data being batch processed can include GNSS signals from multiple epochs and base data (e.g., correction data) from multiple epochs. In this mode, all the recorded data is available to the processing engine, which can go back and forth through many cycles (e.g., may perform forward Kalman filtering and backward Kalman filtering (e.g., smoothing)) and examine all data together back and forth from the beginning to the end. Accordingly, the processing engine can isolate bad data (e.g., measurements from reflected GNSS satellite signals) easier and produce an accurate estimate of a position of the GNSS device.

Using the RTK mode, an RTK solution can be calculated at the rover epoch-by-epoch based on only the most recent observation epoch of GNSS data, which includes the base data (e.g., transmitted from the base to the rover) and the rover data (e.g., GNSS signals received at the rover). The previous GNSS data, which includes the previous base data and rover data (i.e., from epochs before the most recent epoch), is not directly used. Rather, the previous base data and rover data are used in an indirect and progressive way. For example, in a Kalman filter approach, the previous data can be used to shape the filter and improve the ability of an RTK engine (e.g., running on one or more processors of a GNSS device 100) to find an RTK solution; however, the RTK engine does not have direct access to the previous data. In other words, RTK has access only to the GNSS data corresponding to the most recent epoch; the previous GNSS data is discarded once its effect has been accumulated (e.g., by updating the filter state of the Kalman filter). The device cannot go back and access the previous GNSS data in the RTK mode.

The most recent epoch can refer to the most recent observation period (e.g., time window) during which base data and rover data are collected. RTK is a progressive process during which data continues to be collected during multiple epochs while the GNSS device attempts to generate an RTK solution. The length of the epoch can depend on environmental factors and the distance between base and rover. For example, if the sky is not obstructed by trees or buildings, one second or a few seconds may be enough as an epoch. As another example, if the distance between the base and the rover is relatively far, the epoch may be relatively long. This is because when the sky is obstructed (e.g., by trees) and satellite signals bounce off buildings, some data would become corrupted and thus need to be isolated and excluded from the calculation. In such scenarios, more data may be needed, and the epoch can be set to be longer.

The post-processing mode and the RTK mode have their respective advantages and drawbacks. Post-processing may yield more accurate estimates than RTK, partially because post-processing uses more data (i.e., from multiple epochs) but RTK uses data only from the most recent epoch. However, post-processing occurs at a computer separate from the base station and the rover station and thus does not provide solutions in a real-time manner. For a case in which the GNSS data collected at the site is inadequate to support a post-processing solution, the user will not discover this inadequacy until she has returned from the measurement site, which may require the inconvenience of a return to the site to collect more data. The advantage of RTK is that the user gets the solution in the field and does not need to take base and rover data to another computer and process it later. However, RTK solutions may not be as accurate as the post-processing solutions because the RTK solutions are only based on data from the most recent epoch. It can therefore be desirable to integrate post-processing techniques with RTK techniques so that positions can be resolved accurately in real-time using enhanced RTK, and a separate computing device may not be needed for the benefits of post-processing.

RTPK is an enhanced RTK mode. In an RTPK mode, RTK calculations may continue to be made at the rover, but an RTPK operation can be triggered manually or automatically at the rover. The RTPK operation leverages more GNSS data than GNSS data from the most recent epoch and processes the recorded GNSS data in batch processing via multiple cycles at the rover. In some embodiments, the base data, which can span across multiple epochs, is transmitted from the base unit to the rover unit. The rover has access to and can batch-process the GNSS data, which can include both base data and rover data, from multiple epochs and provide the result in near real-time (e.g., as opposed to post-processing solutions that provide results hours later at another location). In an RTPK mode, the processing engine may go back and forth through many cycles (e.g., may perform forward Kalman filtering and backward Kalman filtering (e.g., smoothing)) from the beginning to the end of the buffered data. In an RTPK mode, the processing engine may also estimate and apply one or more parameters of an antenna calibration table, such as phase center variation (PCV) parameters, which identify how much an electrical phase center of the antenna moves with respect to changes in the satellite position (e.g., elevation angle, azimuth). Accordingly, the processing engine can isolate bad data (e.g., measurements from reflected GNSS satellite signals) easier and produce an accurate estimate of a position of the GNSS device.

The RTPK operation can provide location estimates at the rover in the field rather than requiring a separate computer. In other words, the RTPK operation can combine the operational advantages of standard RTK (e.g., the convenience of calculating solutions at the rover) with the computational advantages of post processing (e.g., having access to multiple epochs of data for batch processing). One principal benefit of RTPK may be to provide both forward and backward data processing (e.g., Kalman filtering). Another principal benefit of RTPK may be to provide solution verification, which is a key problem of real-time processing. Conventional RTK processors separate the data stream into two or three sets of data (e.g., GPS+GLONASS, Beidou+Galileo) and process these data sets independently. If the solutions from the different data sets do not match each other, then the RTK process continues to search for a solution (e.g., at the next epoch). In contrast, RTPK may use another type of verification. Instead of separating data into blocks, for example, RTPK may use a partial searching procedure to compare different candidate solutions for verification. This procedure may include determining a best solution by ignoring satellites one by one to determine which satellite signal(s) is bad and should be rejected. Solutions for many different sets of satellites may be evaluated, and measurements from a particular satellite may be used in many different candidate solutions. Iterating through the buffered data in this manner (e.g., until a solution with maximum contrast is identified) may provide more flexibility in the ambiguity-searching process.

In some embodiments, a GNSS device (e.g., GNSS device 100) provides an user interface presenting the RTPK mode. The user interface can include a hardware or a software button labeled "RTPK." When the user selects the button (e.g., via a tap, a long click, etc.), the device displays a RTPK parameter screen. The RTPK parameter screen may provide a plurality of options, such as an OFF option, a MANUAL option, and one or more N-MINUTE options (e.g., 1 min, 2 min, 3 min, 4 min, 5 min, 6 min, 7 min, 8 min, 9 min, 10 min, 15 min, 20 min) and/or M-SECOND options (e.g., 10 sec, 30 sec, 90 sec, 120 sec, 180 sec). These options may specify how an RTPK operation can be triggered and/or configured.

Selection of an N-MINUTE option may cause an RTPK operation to process the data in the RTPK buffer to be initiated (e.g., triggered) if a period of N minutes passes without a successful RTK solution. Similarly, selection of an M-SECOND option may cause an RTPK operation to process the data in the RTPK buffer to be initiated (e.g., triggered) if a period of M seconds passes without a successful RTK solution. For example, if a user selects an N-MINUTE option of 5 minutes, GNSS device 100 may continually receive GNSS data, which includes GNSS signals and/or base station data (e.g., correction data), and attempt to calculate an RTK solution based on the GNSS signals and/or base station data corresponding to the most recent epoch. If GNSS device 100 is unable to calculate an RTK solution based on the most recent epoch, a new set of GNSS signals and/or base station data may be received, and the calculation may be attempted again. The previous set of GNSS signals and/or base station data may be stored in memory (e.g., an designated RTPK buffer). If, after the selected threshold of 5 minutes, an RTK solution cannot be calculated using the most recent epoch, GNSS device 100 triggers an RTPK operation. In some embodiments, GNSS device 100 may use post-processing techniques to calculate a location solution using GNSS signals and/or base station data corresponding to multiple epochs. For example, GNSS device 100 may use some or all GNSS signals and/or base station data received up to that point and/or stored in the buffer to calculate a location estimate. RTPK may be performed in a short amount of time (e.g., less than 3 seconds), which may vary depending on the number of GNSS signals stored in the buffer. Depending on the processor, for example, the ratio of calculation time (time required to calculate the RTPK solution) to observation time (time period over which the buffered data was measured) may be from 1:20 to 1:60. A current progress of RTPK can be presented to a user (e.g., using a visual progress bar on display 112).

During the RTPK operation, GNSS device 100 may continue to concurrently receive new GNSS signals and/or base station data and may continue to concurrently attempt to calculate an RTK solution based on the most recent epoch. In some embodiments, GNSS device 100 may pause attempts to calculate an RTK solution using the most recent epoch while RTPK is being performed. In some embodiments, GNSS device 100 may indicate (e.g., visually on a display, such as display 112, or audibly using a speaker) that a position estimate has been calculated. In some embodiments, GNSS device 100 may indicate whether the position estimate has been calculated and/or originated using RTK and the most recent epoch or using RTPK. The position estimate (regardless of origin) may be automatically accepted by GNSS device 100 and displayed to a user.

If the device cannot determine a solution based on the data from the RTPK buffer, the device may resume RTK from where it left off for another N minutes while appending data to the RTPK buffer. The process may continue until either a solution is found either by RTK, or by RTPK, or stopped (e.g., by input from the user). Auto Accept can be applied to both solutions.

If the user selects the "MANUAL" option, the RTPK operation can be manually triggered by a user. In some embodiments, the GNSS device 100 may continually receive GNSS signals and/or base station data and attempt to calculate an RTK solution based on the GNSS signals and/or base station data corresponding to the most recent epoch. If GNSS device 100 is unable to calculate an RTK solution based on the most recent epoch, a new set of GNSS signals and/or base station data may be received, and the calculation may be attempted again. The previous set of GNSS signals and/or base station data may be stored in memory (e.g., a buffer). This cycle may repeat until a user input is received (e.g., a user may press a physical or virtual button corresponding to RTPK). In response to receiving a user input, GNSS device 100 may initiate calculation of an RTPK solution. In some embodiments, GNSS device 100 may use post-processing techniques to calculate a location estimate using GNSS signals and/or base station data corresponding to multiple epochs. For example, GNSS device 100 may use some or all GNSS signals and/or base station data received up to that point and/or stored in the buffer to calculate a location solution. RTPK may be performed in a short amount of time (e.g., less than 3 seconds), which may vary depending on the number of GNSS signals and/or base station data stored in the buffer. A current progress of RTPK can be presented to a user (e.g., using a visual progress bar on display 112).

During the RTPK operation, GNSS device 100 may continue to concurrently receive new GNSS signals and/or base station data and may continue to concurrently attempt to calculate an RTK solution based on the most recent epoch. In some embodiments, GNSS device 100 may pause attempts to calculate an RTK solution using most recent epochs while RTPK is being performed.

If the device cannot determine a solution based on the data from the RTPK buffer, RTK may resume from where it left off (or continue as it was in the background), and the device can keep appending base and rover data to the RTPK buffer for future RTPK processing (e.g., in response to another user initiation).

In some embodiments, GNSS device 100 may indicate (e.g., visually on a display or audibly using a speaker) that a position estimate has been calculated. In some embodiments, GNSS device 100 may indicate whether the position estimate has been calculated and/or originated using RTK and the most recent epoch, or using RTPK. The position estimate (regardless of origin) may be automatically accepted by GNSS device 100 and displayed to a user. In some embodiments, the position estimate and its origin can be presented to a user, and a user may choose to accept or reject the position estimate. In some embodiments, accepting the estimate may result in storing the position estimate in memory, and the RTPK buffer may be cleared. In some embodiments, rejecting the position estimate may result in restarting RTK with the latest epoch or RTPK, and the RTPK buffer may be cleared. In some embodiments, a stop button can available to stop all calculations (e.g., RTK and RTPK) and clears the RTPK buffer.

If "OFF" is selected, RTPK mode can be deactivated. In summary, in some embodiments of the present disclosure, the device (e.g., a GNSS rover device) records the base data and the rover data in real time. The device processes the recorded data at the device in real time or substantially real time (in one example, at an accelerated rate of sixty times with respect to the period of time over which the buffered data was measured). Even if RTK techniques fail, the RTPK operation can be triggered to process data at the device. Because RTPK has access to all previous data in the buffer, the RTPK operation has more flexibility than RTK and it is in real time or substantially real time (e.g., a fraction of a second of delay). In some embodiments, the RTK solution(s) and the RTPK solution(s) can be compared for verification purposes at the device (e.g., in the field).

Figure 3:
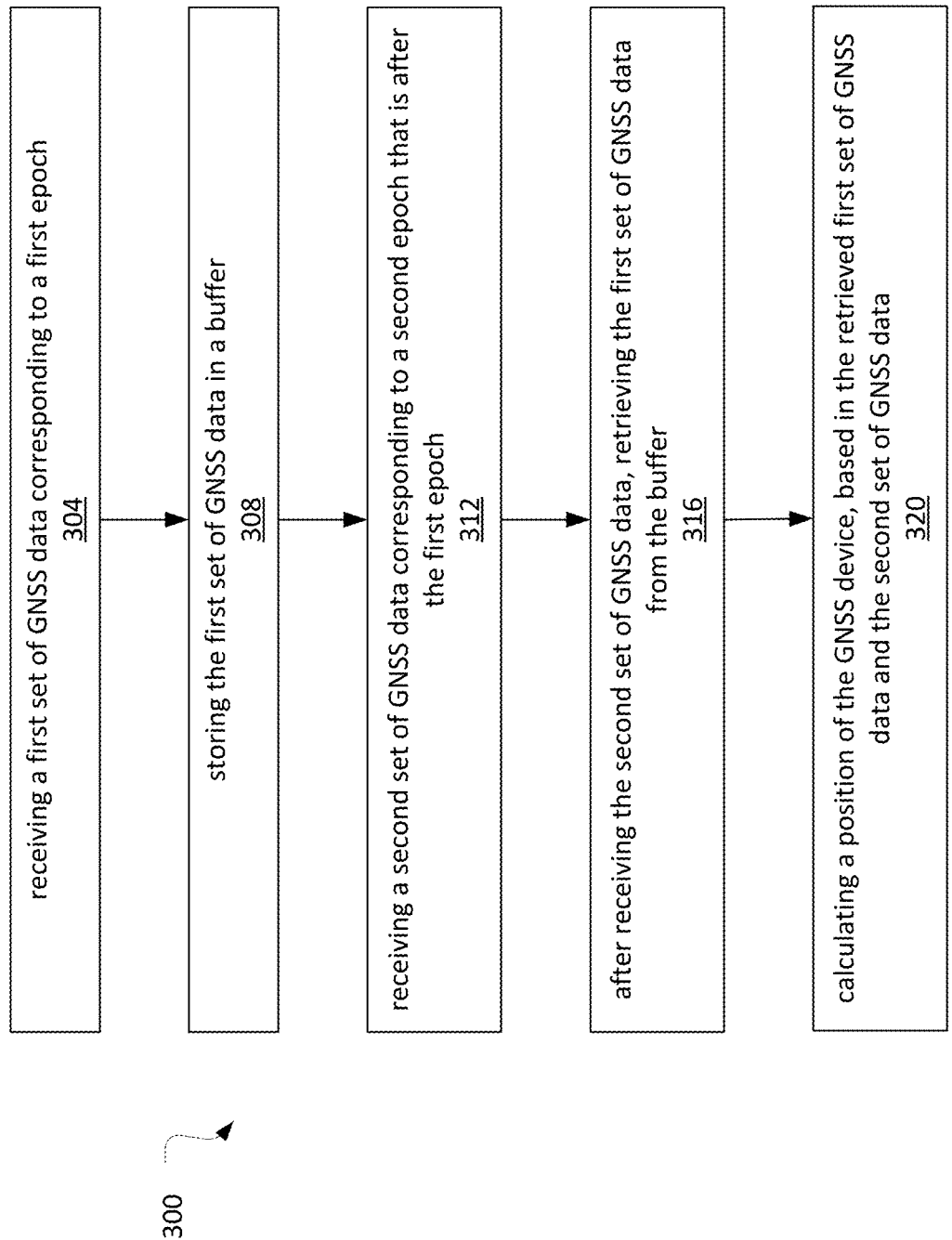
FIG. 3 illustrates an example process for calculating a position of a GNSS device according to embodiments as disclosed herein.

FIG. 3 illustrates a process 300 for calculating a position of a GNSS device (e.g., a GNSS rover device), according to various examples. Process 300 is performed, for example, using an electronic device (e.g., a GNSS rover device). For example, process 300 may be performed by processing circuitry (e.g., one or more processors, such as processor 230) of a GNSS rover device. In process 300, some blocks are, optionally, combined, the order of some blocks is, optionally, changed, and some blocks are, optionally, omitted. In some examples, additional steps may be performed in combination with the process 300. Accordingly, the operations as illustrated (and described in greater detail below) are exemplary by nature and, as such, should not be viewed as limiting.

At block 304, the GNSS device receives a first set of GNSS data corresponding to a first epoch. The first set of GNSS data comprises both GNSS signals received by the GNSS device and base station data (e.g., correction data). For example, the first set of GNSS data may include, for the first epoch, first measurements of a plurality of GNSS satellite signals, wherein the first measurements are performed at the GNSS device, and second measurements of the plurality of GNSS satellite signals, wherein the second measurements are received from another GNSS device (e.g., a base station). The first and second measurements may include code phase measurements and carrier phase measurements for each of the plurality of GNSS satellite signals. The first and second measurements may include Doppler measurements and/or signal strength for each of the plurality of GNSS satellite signals. The plurality of GNSS satellite signals may be from satellites of only one constellation (e.g., GPS, GLONASS, Galileo, BeiDou, QZSS (Japan), NAVIC/IRNSS (India)) or from satellites of two or more constellations. The plurality of GNSS satellite signals may be within one frequency band (e.g., the L1 or E1 band) or may be from two or more different frequency bands.

At block 308, the GNSS device stores the first set of GNSS data in a buffer (e.g., in system memory (dynamic or static RAM), nonvolatile (e.g., flash) RAM, disk storage, a USB drive, etc.). At block 312, the GNSS device receives a second set of GNSS data corresponding to a second epoch that is after the first epoch. The second set of GNSS data comprises both GNSS signals received by the GNSS device and base station data (e.g., correction data). For example, the second set of GNSS data may include, for the second epoch, first and second measurements of the plurality of GNSS satellite signals as described above.

At block 316, the GNSS device, after receiving the second set of GNSS data, retrieves the first set of GNSS data from the buffer. At block 320, the GNSS device calculates a position of the GNSS device (e.g., latitude, longitude, and altitude), based on the retrieved first set of GNSS data and the second set of GNSS data. Calculating the position of the GNSS device may also be based on other data, such as, for example, a position of the base station (e.g., base station coordinates), rover antenna type and/or height, etc.

Calculating the position of the GNSS device may include, for each of the plurality of GNSS satellite signals, resolving a carrier-phase integer ambiguity. Calculating the position of the GNSS device may include, for the first epoch, calculating a corresponding filter state (e.g., a corresponding filter state of a Kalman filter); and then using information from the second set of GNSS data to update the calculated filter state for the first epoch. Calculating the position of the GNSS device may include calculating a first solution and calculating a second solution, wherein the first solution is based on measurements of a first of the plurality of GNSS satellite signals and measurements of a second of the plurality of GNSS satellite signals, and the second solution is based on the measurements of the first of the plurality of GNSS satellite signals and is not based on the measurements of the second of the plurality of GNSS satellite signals.

Additionally or alternatively, calculating the position of the GNSS device may include calculating a value of a characteristic of a GNSS antenna of the GNSS device that is used to receive the plurality of GNSS satellite signals, based on the retrieved first set of GNSS data and the second set of GNSS data. Such calculating a value of an antenna characteristic may include calculating a first value of the characteristic for a first GNSS satellite elevation angle; and calculating a second value of the characteristic that is different than the first value for a second GNSS satellite elevation angle that is different than the first GNSS satellite elevation angle. In one example, the antenna characteristic is a phase center variation, which identifies how much an electrical phase center of the antenna moves with respect to changes in the satellite position (e.g., elevation angle, azimuth). In another example, the antenna characteristic is a frequency dependence of the phase center.

Calculating the position of the GNSS device may be performed by a processor of the GNSS device (e.g., rover device) that has a reduced instruction set computer (RISC) architecture (e.g., an ARM processor), as opposed to a processor having a complex instruction set computer (CISC) architecture (e.g., an Intel processor or other implementation of an x86 architecture). The ARM processor may include, for example, an implementation of an ARM architecture such as ARMv7, ARMv8, ARMv9, or a variant thereof.

In some embodiments, process 300 is performed by a GNSS rover device in an enhanced RTK mode. In some embodiments, the process further comprises: at the GNSS rover device in a standard RTK mode: receiving a set of GNSS data corresponding to a most recent epoch; calculating the location of GNSS rover device based on the set of GNSS data; and foregoing storing the set of GNSS data in the buffer.

In some embodiments, the first set of GNSS data is retrieved in response to a user input.

In some embodiments, the first set of GNSS data is retrieved in response to a determination that the location of the GNSS rover device has not been successfully calculated for a predetermined amount of time.

Figure 4:
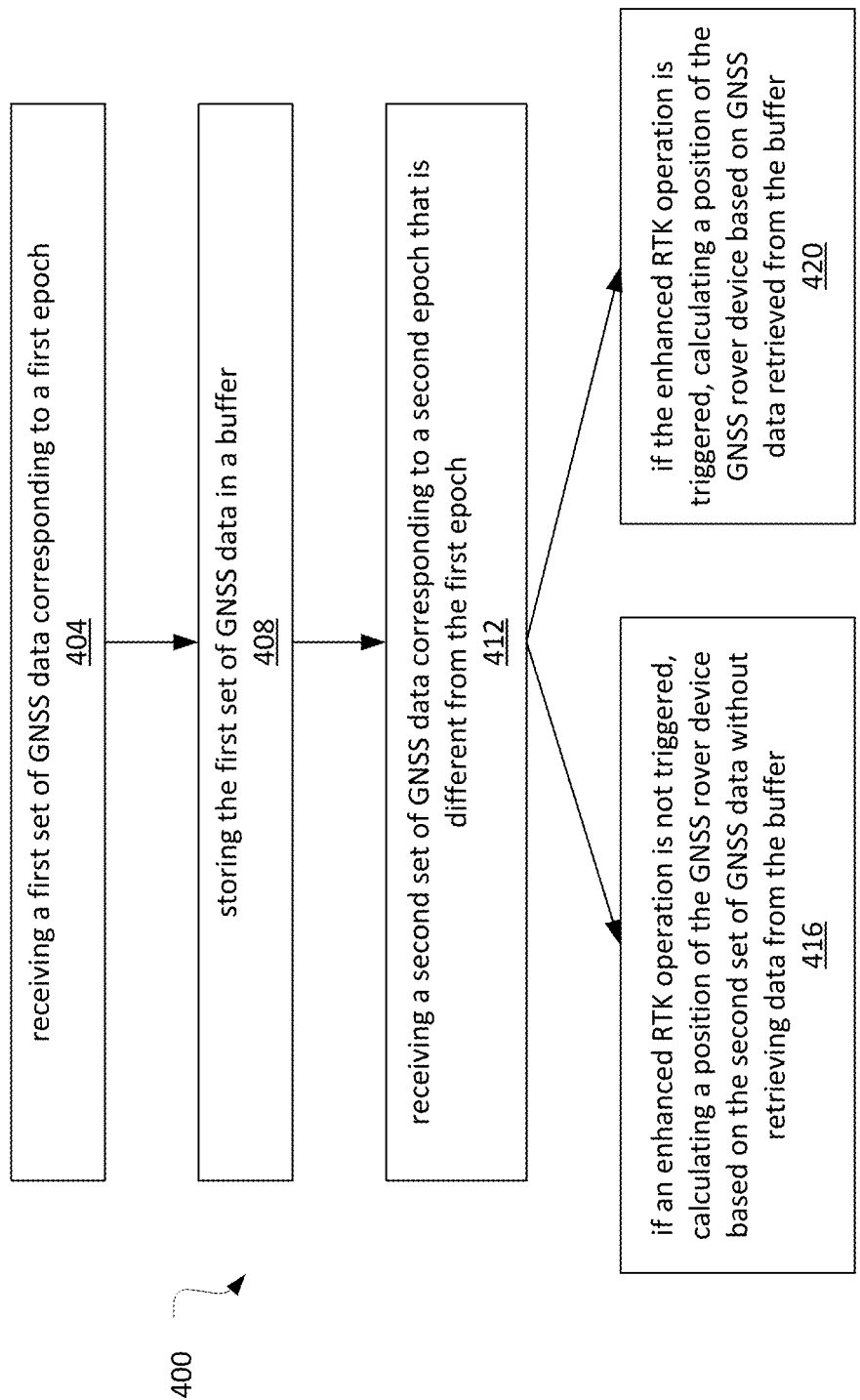
FIG. 4 illustrates another example process for calculating a position of a GNSS rover device according to embodiments as disclosed herein.

FIG. 4 illustrates a process 400 for calculating a position of a GNSS device (e.g., a GNSS rover device), according to various examples. Process 400 is performed, for example, using an electronic device (e.g., a GNSS rover device). For example, process 400 may be performed by processing circuitry (e.g., one or more processors, such as processor 230) of a GNSS rover device. In process 400, some blocks are, optionally, combined, the order of some blocks is, optionally, changed, and some blocks are, optionally, omitted. In some examples, additional steps may be performed in combination with the process 400. Accordingly, the operations as illustrated (and described in greater detail below) are exemplary by nature and, as such, should not be viewed as limiting.

At block 404, the GNSS device receives a first set of GNSS data corresponding to a first epoch (e.g., as described herein with reference to block 304). At block 408, the GNSS device stores the first set of GNSS data in a buffer (e.g., as described herein with reference to block 308). At block 412, the GNSS device receives a second set of GNSS data corresponding to a second epoch different from the first epoch (e.g., as described herein with reference to block 312). At block 416, if an enhanced RTK operation is not triggered, the GNSS device calculates a position of the GNSS rover device based on the second set of data without retrieving data from the buffer (e.g., by calculating an RTK solution). At block 420, if an enhanced RTK operation is triggered, the GNSS device calculates a position of the GNSS rover device based on data retrieved from the buffer (e.g., as described herein with reference to block 320).

In some embodiments, process 400 further comprises at the GNSS rover device in a standard RTK mode: receiving a set of GNSS data corresponding to a most recent epoch; calculating a position of the GNSS rover device based on the set of GNSS data; and forgoing storing the set of GNSS data in the buffer.

In some embodiments, the enhanced RTK operation is triggered by an input by a user.

In some embodiments, the enhanced RTK operation is triggered by a determination that the location of the GNSS rover device has not been successfully calculated for a predetermined amount of time.

In some embodiments, the predetermined amount of time is user-selectable.

In some embodiments, process 400 further comprises clearing the buffer based on a user input.

It will be appreciated that, for purposes of clarity, the above description has described embodiments with reference to different functional units and processors. However, it will be apparent that any suitable distribution of functionality between different functional units, processors, or domains may be used. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Any of the methods or processes disclosed herein may be implemented as one or more non-transitory, computer-readable media that includes instructions that may be executed by one or more processors (e.g., processor 230) to cause a GNSS device (e.g., a GNSS rover, GNSS device 100) to perform such a method or process. Furthermore, although individually listed, a plurality of means, elements, or method steps may be implemented by, for example, a single unit or processor. Additionally, although individual features may be included in different claims, these may possibly be advantageously combined, and the inclusion in different claims does not imply that a combination of features is not feasible or advantageous. Also, the inclusion of a feature in one category of claims does not imply a limitation to this category, but rather the feature may be equally applicable to other claim categories, as appropriate.

Although a feature may appear to be described in connection with a particular embodiment, one skilled in the art would recognize that various features of the described embodiments may be combined. Moreover, aspects described in connection with an embodiment may stand alone.

What is claimed is:

1. A method of calculating a position of a Global Navigation Satellite Systems (GNSS) device, the method comprising:
receiving a first set of GNSS data corresponding to a first epoch, for the first epoch, calculating a corresponding filter state;
storing the first set of GNSS data in a buffer;
receiving a second set of GNSS data corresponding to a second epoch that is after the first epoch;
after receiving the second set of GNSS data, retrieving the first set of GNSS data from the buffer; and
calculating a position of the GNSS device, based on the retrieved first set of GNSS data and the second set of GNSS data;
using information from the second set of GNSS data, updating the calculated filter state for the first epoch.

2. The method of claim 1, wherein each of the first set of GNSS data and the second set of GNSS data includes:
first measurements of a plurality of GNSS satellite signals, wherein the first measurements are performed at the GNSS device, and
second measurements of the plurality of GNSS satellite signals, wherein the second measurements are received from another GNSS device.

3. The method of claim 2, wherein the first measurements include code phase measurements and carrier phase measurements, and
wherein the second measurements include code phase measurements and carrier phase measurements.

4. The method of claim 3, wherein the first measurements include Doppler measurements, and wherein the second measurements include Doppler measurements.

5. The method of claim 1, wherein the calculating the position of the GNSS device includes, for each of the plurality of GNSS satellite signals, resolving a carrier-phase integer ambiguity.

6. The method of claim 1, wherein the calculating the position of the GNSS device is performed by a processor of the GNSS device that is a reduced-instruction-set computer.

7. The method of claim 1, wherein the calculating the position of the GNSS device comprises calculating a value of a characteristic of a GNSS antenna of the GNSS device that is used to receive the plurality of GNSS satellite signals, based on the retrieved first set of GNSS data and the second set of GNSS data.

8. The method of claim 1, wherein the first set of GNSS data is retrieved in response to a user input.

9. The method of claim 1, wherein the first set of GNSS data is retrieved in response to a determination that a position of the GNSS device has not been successfully calculated for a predetermined amount of time.

10. The method of claim 1, further comprising:
receiving a third set of GNSS data corresponding to a third epoch that is after the first and second epochs;
calculating a position of the GNSS device, based on the third set of GNSS data; and
forgoing storing the third set of GNSS data in the buffer.

11. The method of claim 1, wherein the GNSS device is a rover.

12. A Global Navigation Satellite Systems (GNSS) rover device comprising:
a buffer; and
processing circuitry to:
receive a first set of GNSS data corresponding to a first epoch;
store the first set of GNSS data in the buffer;
receive a second set of GNSS data corresponding to a second epoch that is different from the first epoch;
if an enhanced real-time kinematic (RTK) operation is not triggered, calculate a position of the GNSS rover device based on the second set of GNSS data without retrieving data from the buffer; and
if the enhanced RTK operation is triggered, calculate a position of the GNSS rover device based on GNSS data retrieved from the buffer.

13. The GNSS rover device of claim 12, wherein the processing circuitry is further to, if the enhanced RTK operation is not triggered:
receive a third set of GNSS data corresponding to a third epoch that is after the first and second epochs;
calculate a position of the GNSS rover device based on the third set of GNSS data; and
forgo storing the third set of GNSS data in the buffer.

14. The GNSS rover device of claim 12, wherein the processing circuitry is further to trigger the enhanced RTK operation in response to an input by a user.

15. The GNSS rover device of claim 12, wherein the processing circuitry is further to trigger the enhanced RTK operation in response to a determination that a position of the GNSS rover device has not been successfully calculated for a predetermined amount of time.

16. The GNSS rover device of claim 15, wherein the predetermined amount of time is user-selectable.

17. The GNSS rover device of claim 12, wherein the processing circuitry is further to clear the buffer based on a user input.

18. A method of calculating a position of a Global Navigation Satellite Systems (GNSS) device, the method comprising:
receiving a first set of GNSS data corresponding to a first epoch;
storing the first set of GNSS data in a buffer;
receiving a second set of GNSS data corresponding to a second epoch that is after the first epoch;
after receiving the second set of GNSS data, retrieving the first set of GNSS data from the buffer; and
calculating a position of the GNSS device, based on the retrieved first set of GNSS data and the second set of GNSS data;
calculating a value of a characteristic of a GNSS antenna of the GNSS device that is used to receive the plurality of GNSS satellite signals, based on the retrieved first set of GNSS data and the second set of GNSS data.

19. The method of claim 18, wherein the calculating a value of the characteristic of the GNSS antenna comprises:
calculating a first value of the characteristic for a first GNSS satellite elevation angle; and
calculating a second value of the characteristic that is different than the first value for a second GNSS satellite elevation angle that is different than the first GNSS satellite elevation angle.

20. The method of claim 18, wherein the characteristic of the GNSS antenna is a phase center variation.

* * * * *